United States Patent [19]

Agulnek

[11] Patent Number: 4,809,020
[45] Date of Patent: Feb. 28, 1989

[54] CONTROL APPARATUS FOR ELECTRONIC IMAGE PRINTER

[75] Inventor: Martin A. Agulnek, Sharon, Mass.

[73] Assignee: Polaroid Corporation, Cambridge, Mass.

[21] Appl. No.: 207,287

[22] Filed: Jun. 15, 1988

Related U.S. Application Data

[63] Continuation of Ser. No. 138,063, Dec. 28, 1987, abandoned.

[51] Int. Cl.$^4$ ............................................. G01D 15/00
[52] U.S. Cl. .................................. 346/107 R; 346/108
[58] Field of Search ................... 346/160, 107 R, 108; 358/300, 302; 101/DIG. 13; 400/119

[56] References Cited

U.S. PATENT DOCUMENTS

| | | | |
|---|---|---|---|
| 4,117,320 | 9/1978 | Tomlinson et al. | 250/237 |
| 4,179,183 | 12/1979 | Tateoka et al. | 350/6.1 |
| 4,360,769 | 11/1982 | Selkey et al. | 318/601 |
| 4,368,412 | 1/1983 | Inoue | 318/632 |
| 4,558,372 | 12/1985 | Culter | 358/264 |
| 4,593,193 | 6/1986 | Michaelis | 250/231 |
| 4,686,545 | 8/1987 | Kimura | 346/160 |
| 4,709,250 | 11/1987 | Takeuchi | 346/160 |
| 4,725,855 | 2/1988 | Arimoto et al. | 346/108 |
| 4,745,416 | 5/1988 | Hurihata | 346/108 |

Primary Examiner—Arthur G. Evans
Attorney, Agent, or Firm—Leslie J. Payne

[57] ABSTRACT

There is disclosed a control apparatus which controls the presentation of electronic data per scanning line to an image recording material.

6 Claims, 9 Drawing Sheets

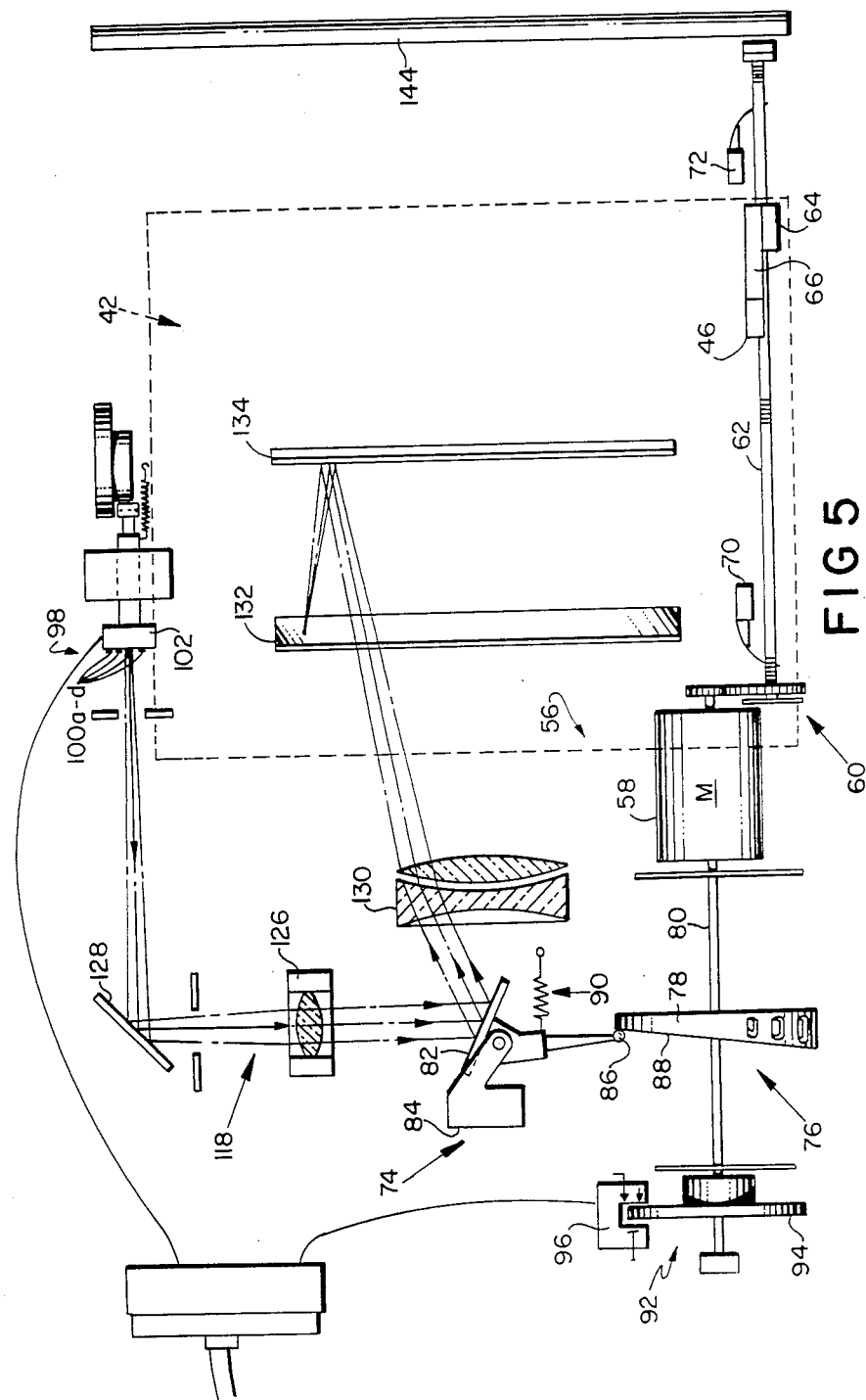

CONTROL APPARATUS FOR ELECTRONIC IMAGE PRINTER

CROSS-REFERENCE TO RELATED APPLICATION

The applicant is a continuation of Ser. No. 138,063, filed 12-28-87, now abandoned.

This application is related to copending and commonly assigned application Ser. No. 158,585 filed on Feb. 22, 1988 which is a continuation of Ser. No. 104,770 filed on Oct. 5, 1987, by Lawrence M. Douglas entitled ELECTRONIC IMAGE PRINTING APPARATUS and which is now abandoned.

BACKGROUND OF THE INVENTION

The present invention relates generally to an improved electronic image printer and, more particularly, to apparatus for controlling the operation thereof, especially the presentation of data to image recording material.

Various forms of electronic imaging printers of the type which generate and record images representative of electronic information on image recording material are well known in the art.

One known kind of printer is described in U.S. Pat. No. 4,179,183, wherein there is disclosed a focused laser beam scanning apparatus for use in printing images. Included is a polygonal mirror which is used for achieving a fast scan motion of the laser beam across image recording material. With light scanning printer systems of this type, completion and repeatability of successive scanning lines is important. This is extremely so when the resultant image is to be of photographic quality. It should be understood that misplacement of even one scanning line can affect adversely the quality of the image produced.

This invention is related to the type of electronic image printer described in the above-noted application. Essentially, the application discloses a printer having a system under open loop control which is responsible for simultaneously generating fast and slow scanning movements needed for image production as well as energizing light emitting diodes responsive to rotation of a rotary motor driving the scanning movements. In such a printer, it is important to properly present the data to the light emitting elements at the appropriate time. In this regard, pixel time and placement variations should remain within constraints which provide acceptable photographic type images from one scan line to the next. In this manner, the pixels are placed at preselected positions so that the resultant image lines are straight and do not overlap. Clearly, while electronic printers of the type described in the aforementioned application show desirable performance there is ongoing interest in improving the operational aspects of such printers.

SUMMARY OF THE INVENTION

In accordance with the principles of the present invention there is provided an improved electronic image printer apparatus for printing images on image recording material.

Included in an illustrated embodiment of the apparatus is a housing assembly as well as means for advancing the image recording material relative to the housing assembly in at least a first printing direction. Provision is made for at least a light beam producing means. There is provided means operable for scanning the light beam across a scanning line on the image recording material. Means for displaceably driving the light beam scanning means is provided. Provision is made for means for providing periodic control signals responsive to displacement of the driving means wherein the frequency of the periodic control signals are representative of the scanning speed of the light beam. This latter means also provides at least a start signal representative of commencement of a printing cycle. This embodiment includes means responsive to the control and start signals for providing fixed time intervals for the light beam producing means for each scanning line, during which the corresponding light beam producing means is energizable. Responsive to these control and start signals provision is made for providing a predetermined number of pixel exposure time interval signals for each scanning line, each of the exposure time interval signals having a time duration equivalent in time to a maximum exposable time interval during which the light beam producing means is energizable. The exposure time interval signals have a preselected frequency ratio relative to the frequency of the control signals. This embodiment includes means for providing image information data signals for successive pixels on successive lines on the image recording material. The image information data signals are representing the amount of current to be supplied to the light beam producing means for successive pixels on successive lines on the image recording material. Provision is made for means responsive to successive ones of the image information data signals and to corresponding successive ones of the exposure time interval signals for energizing the light beam producing means. Optical means is provided for directing the light beam onto the image recording material.

In one illustrated embodiment, the driving means includes a rotary motor having a rotary output; and the means for providing the periodic control signals and the start signal includes encoding means responsive to the rotary output.

In another illustrated embodiment, the means for providing the periodic control signals includes a phase lock loop circuit.

In another illustrated embodiment, the means for providing the fixed time intervals includes at least an interval counter which establishes the fixed time intervals for the light beam producing means. The counter also counts a predetermined number of the control signals for each scanning line, thereby indicating each new scanning line.

In another illustrated embodiment, the means for providing image information data signals includes a microprocessor apparatus having coupled thereto a memory device for providing the data signals with color level information relating to current intensity levels for each pixel.

In another illustrated embodiment, the means responsive to the image information data signals and the corresponding exposure time interval signals includes at least a buffer means and, a respective one of at least a current driver which provides current to the light beam producing means.

In another embodiment, there is provided means for adjusting for increases or decreases in the frequency of the exposure time interval signals by regulating the intensity of the light beam producing means and the duration the light beam producing means is on, so that light output of the light producing means is generally constant per pixel spot.

Among the other objects of the present invention are, therefore, the provision of an apparatus which simply and reliably controls scanning of light beams on image recording material; the provision of such as apparatus which is inexpensive to both manufacture and operate; and, the provision of an apparatus which prints images on an image recording material with virtually no distortion of the image.

These and other objects and features and the invention itself will become apparent from the following description when taken in conjunction with the accompanying drawings wherein like structure throughout the several views are indicated by like reference numerals.

BRIEF DESCRIPTION OF THE DRAWINGS

FIG. 5 is a diagrammatic planar view of components forming the electronic image printing apparatus of this invention;

DETAILED DESCRIPTION

Figure 1:
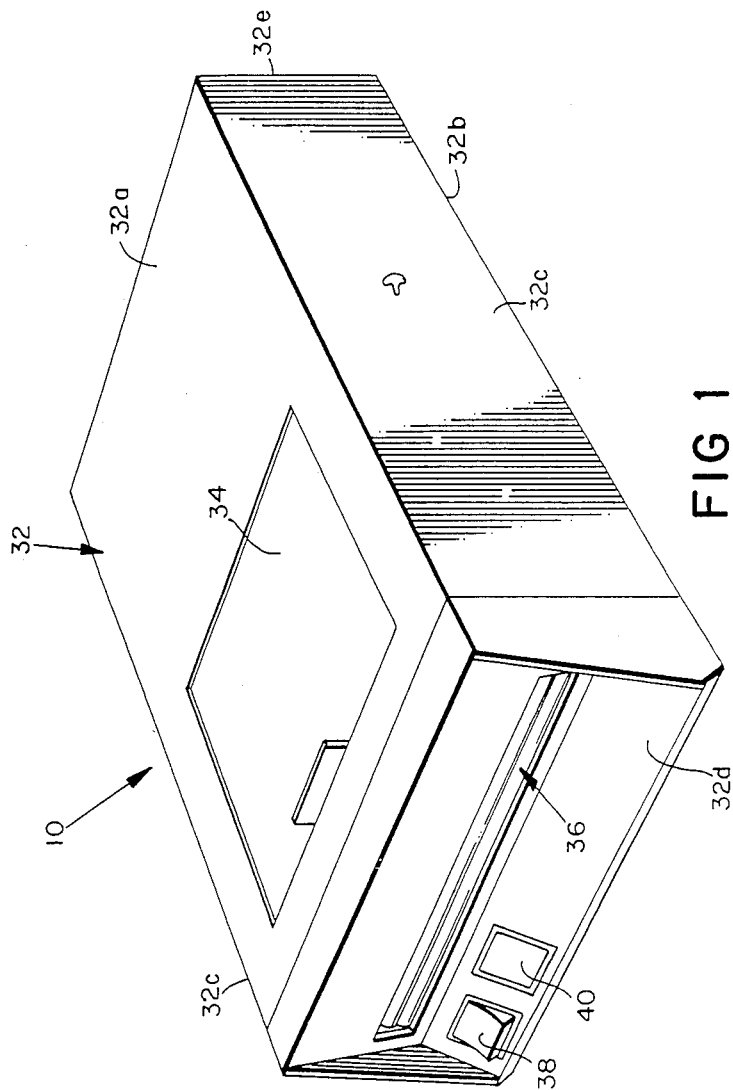
FIG. 1 is a perspective view of a preferred embodiment of an electronic image printing apparatus made in accordance with the principles of the present invention.

Reference is made to FIGS. 1-9 for showing a preferred embodiment of an electronic image printing apparatus 10 including an electronic control apparatus 12 (FIG. 9) of the present invention. The printing apparatus 10 is like that described in the last noted application. Hence, a detailed description thereof is not believed necessary. Accordingly, only those features needed to understand the present invention will be set forth. The printing apparatus 10 is intended for use in generating and developing images on individual ones of a plurality of photosensitive film units 14. Although film units are disclosed, the present invention envisions other types of image recording materials as well. The units 14 are of the self-developing type, such as the kind manufactured by Polaroid Corporation. Whatever kinds of image recording materials are selected, they should, of course, be sensitive to exposure by a suitable source of energy used for recording purposes. Each of the film units 14 is adapted to be processed following exposure by the printing apparatus 10. As is known, a pod (not shown) in the film unit 14 is ruptured when it is advanced to and between a pair of pressure applying spread rollers; to be described. These cause processing fluid in the pod to be spread between positive and image receiving elements (not shown) in such units. This initiates a diffusion transfer process, whereby latent images on an image forming area thereof are developed. The film units 14 are held in a stacked array in a film cassette or box 16.

The film cassette 16 (FIGS. 2 & 4) has a generally parallelpiped structure, and as described more fully in the last-noted application, includes a downwardly facing wall which defines a generally rectangular light exposure aperture 18. The aperture 18 is in registry with image forming areas of successive ones of the film units 14. The film cassette 16 includes an upwardly facing wall 20 and a leading end wall assembly 22. The aperture 18 faces downwardly so that the image area of each of the successive film units 14 is facing downwardly. A battery 26 in the film cassette 16 can provide electrical power for certain operations of the printing apparatus 10, such as powering the control apparatus 12 in the event of an electrical power outage. For ejecting each of the film units 14, the film cassette 16 is formed with an elongated recess or cutout 17 (FIGS. 6 & 7) which is constructed to allow a picking mechanism, to be described later, to push successive exposed film units 14 through an exit opening 28 formed in the leading end wall assembly 22.

Reference is now made to FIGS. 1-4 for better showing a portable housing assembly 32 which is made of an opaque and lightweight material. The housing assembly 32 includes a parallelpiped structure having top wall 32a, bottom wall 32b, opposing sidewalls 32c and respective front and back walls 32d and 32e. Formed in the top wall 32a is an opening which cooperates with a door 34 mounted for slidable movement between open and closed positions. Whenever the door 34 is open, it allows entry and removal of the film cassette 16. The film units 14 when ejected from the film cassette 16 are advanced through the front wall 32d. In this regard, the front wall 32d includes an exit or discharge slot 36. The front wall 32d has mounted thereon an on-off switch 38 which, when actuated, effects commencement of an image generating and printing cycle. Also, an indicator lamp 40 is mounted on the front wall 32d for purposes of indicating that the printing apparatus 10 is operating. Other suitable switches and devices can be provided.

A film cassette carriage 42 (FIGS. 2-4 and 6) is mounted in the interior of the housing assembly 32 so as to move reciprocally along a predetermined axial path between an image printing start position and a film unit withdrawal position. The path is defined by a pair of spaced apart and parallel longitudinally extending guide rods 44 having their opposite ends supported in the housing assembly 32. Laterally extending from each side of the film cassette carriage 42 is a pair of linear bearing assemblies 46, each pair of which is mounted on a respective guide rod 44 for facilitating sliding movement of the film cassette carriage.

For releasably clamping the film cassette 16 in the film cassette carriage 42 there is provided a pair of clamping arms 48 which can be pivoted to engage the wall 20 in a manner which causes the film cassette 16 to be securely mounted in the carriage. Thus, undesired movement of the film cassette 16 caused by vibrations and the like does not occur.

The film cassette carriage 42 has a ledge portion 50 defining an aperture 52 which is sized and shaped so that the aperture 18 and, therefore, the entire image area of successive ones of the film units 14 can be exposed. The film cassette carriage 42 is also formed with a pick slot only partially shown at 54 (FIG. 6) which allows picking of an exposed film unit 14 from the film cassette 16.

Figure 2:
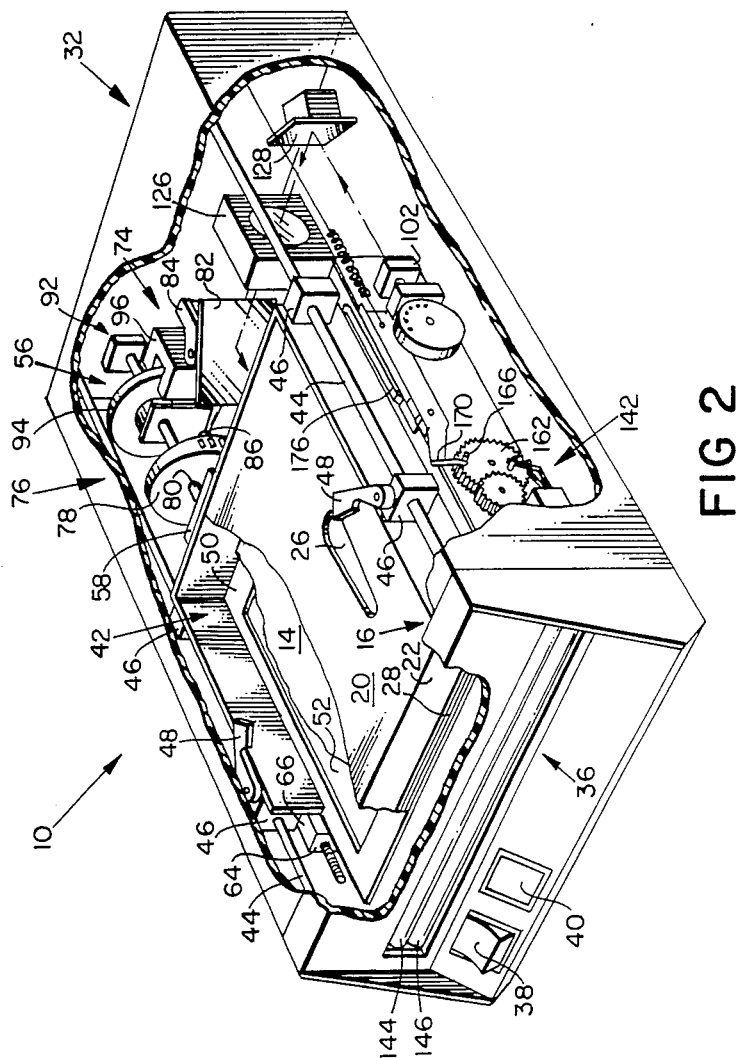
FIG. 2 is a view similar to FIG. 1 with components broken away to depict in diagrammatic form certain components of the preferred embodiment.
Figure 3:
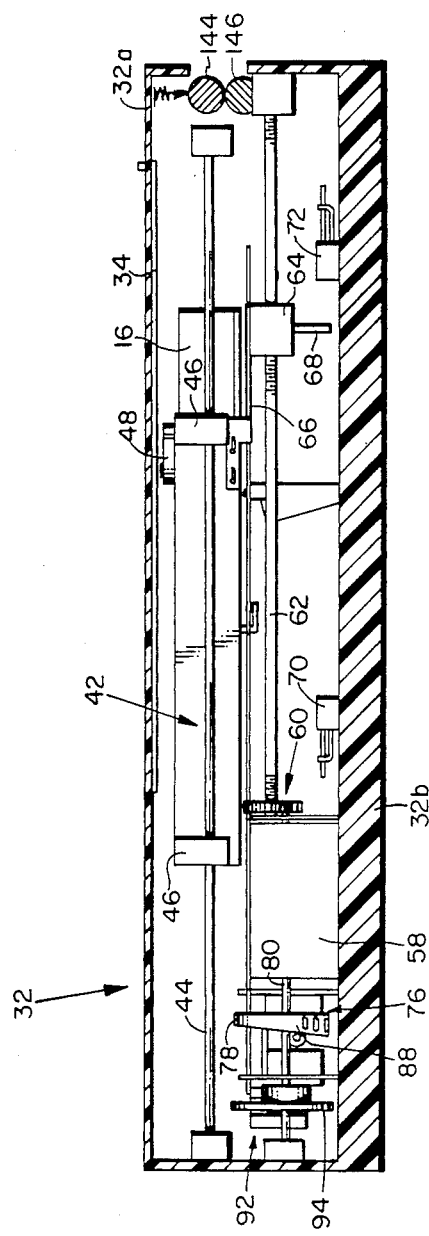
FIG. 3 is a side elevational view in cross-section showing components of the preferred embodiment.
Figure 9:
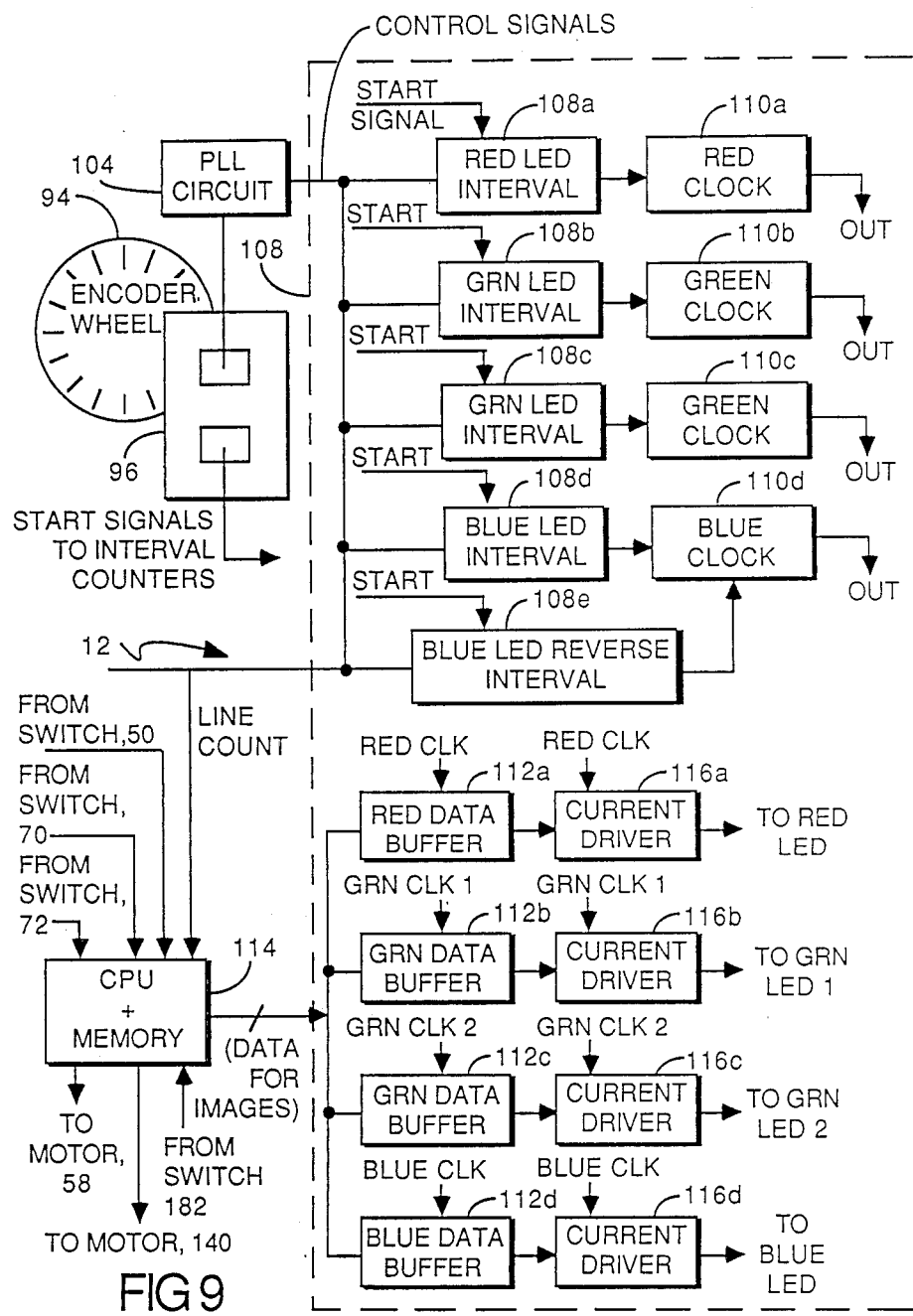
FIG. 9 is a block diagram of control circuitry for use in a preferred embodiment of the apparatus of the present invention.

The present invention includes a compact scanning driving mechanism or means 56 which is operable for simultaneously operating both fast and slow scanning movements. Reference is made to FIGS. 2-4 and 6 for showing the scanning driving mechanism 56. For effecting the slow scan movement in a first printing direction there is provided an electric driving motor 58, a gear reduction arrangement generally indicated at 60 and a high precision carriage advance lead screw 62 having threadedly coupled thereto a coupling nut 64 (FIGS. 2 & 3). The coupling nut 64 is connected to the film cassette carriage 42. The driving motor 58 starts and stops responsive to appropriate signals from the apparatus control circuit 12 (FIG. 9). The driving motor 58 is appropriately energized at the commencement of an image generating and printing cycle and is effective to bidirectionally drive the lead screw 62 through the gear reduction arrangement 60. The coupling unit 64 is connected to the bottom of the linear bearing assembly 46 by a flexible strap 66 and is thus prevented from rotating. Thus, rotational movement of the motor's output shaft is converted to axial movement of the cassette carriage 42. This is the so-called slow scan movement of the film cassette carriage 42 which is transverse to the fast scan movement. The slow scan can, of course, be varied by varying the output speed of the driving motor 58.

A switch contact member 68 (FIG. 3) depends from the coupling nut 64 and is adapted to engage limit switches 70 and 72. Each limit switch is located respectively adjacent an opposite end of the coupling nut's movement, such as shown in FIG. 3. Selective actuation of the limit switches 70 and 72 results in ending of the linear movement of the film cassette carriage 42 by effectively stopping operation of the driving motor 58.

Simultaneously with the slow scan movement, there is provided fast scanning movement. Fast scanning is considered movement of modulated light spots across the width of the film units 14 in a second printing direction generally transverse to the first printing direction. Both the slow and fast scanning movements provide for raster scan imaging on the image forming area of the units 14.

Reference is made to FIGS. 2-4 and 5 for showing structure which is operable for performing the fast scanning movement. Included is an oscillatable scanning mirror assembly 74 which is directly oscillated by a mirror driving mechanism 76. The driving mechanism 76 includes a rotatable cam 78 directly connected to an output shaft 80 of the driving motor 58. The scanning mirror assembly 74 includes a generally rectangular scan mirror 82 mounted for oscillation about a vertical axis defined by an upstanding support 84. The scanning mirror 82 serves to deflect the bundles of light being emitted from a light source to be described. Essentially, the scanning mirror 82 scans the film plane with a plurality of light spots. In this embodiment, the scanning mirror 82 is rotated and its path includes overtravel which is sufficient to insure that an exposure or scanning line extends a distance slightly greater than the entire width of each of the imaging areas exposed. This accomodates for slight misalignment of components.

A cam follower 86 is integral with the scanning mirror 82 and has one end biased against a camming surface 88 of the cam 78 by a biasing spring 90. The spring 90 yieldably urges the mirror 82 to the starting scan position. As the camming surface 88 rotates in response to rotation of the output shaft 80, the cam follower 86 will effect mirror oscillation. A significant advantage of having the scanning mirror 82 coupled to the cam 78 is that this relationship insures that the mirror provides uniform displacement of a pixel or image spot from one spot on the film to the next across the image forming areas of the film units regardless of rotational speed variations of the driving motor 58.

The cam profile is selected to allow the scanning mirror 82 to print or expose along equal increments of the film plane with the light spots being representative of electronic data and being delivered at a fixed frequency. This assumes the motor output shaft 80 rotates at a constant speed. The cam profile is generally symmetrical so that during one half of the revolution thereof, the scanning mirror 82 is displaced in a printing or exposing direction, while the remaining half is considered to be the rescan or retrace direction. It will be appreciated that the cam 78 need not be symmetrical in order for the system to function properly. For instance, a non-symmetrical cam can provide greater time for printing than for a reverse or retrace motion of the mirror 82. Accordingly, there is greater pixel-to-pixel time for exposure. This is helpful when it comes to printing blue. Also, with a non-symmetrical cam there need not be a retrace. The scanning mirror 82 returns to the initial or start scan position following rotation of the cam profile. The rescan in this embodiment while not effective to cause further printing or retracing does allow, for example, a blue light emitting diode to remain on for added exposure of such spectral wavelength along the exposure line. Since the cam profile is symmetrical, the scan and rescan time will be the same.

Reference is made to FIGS. 2, 3, 5 and 9 for showing an encoder means or mechanism 92 having an encoder wheel 94 fixedly mounted to the motor output shaft 80 and which wheel has a plurality of generally radially extending markings, diagrammatically shown in FIG. 9, which are sensed by an optical sensor 96 of the type used in conjunction with encoder wheels. The optical sensor 96 transmits and receives light through transmissive portions of the encoder wheel 94. The optical sensor 96 and the encoder wheel 94 provide signals responsive to displacement of the rotary output of the motor 58. The optical sensor 96 which generates encoder ticks serves to represent or reflect the variations of the rotational speed of the output shaft 80 and thereby the scanning mirror 82. In this embodiment, each time a marking is sensed by the optical sensor 96, a light beam producing means or light source 98, as will be explained, is energized to emit light to be directed to the film units.

In this embodiment, the light source 98 (FIG. 8) includes four light emitting diodes 100a-d which are capable of generating color images. While the present embodiment discloses the use of light emitting diodes 100a-d, the present invention contemplates other kinds of energy emitting sources, such as laser diodes.

Figure 8:
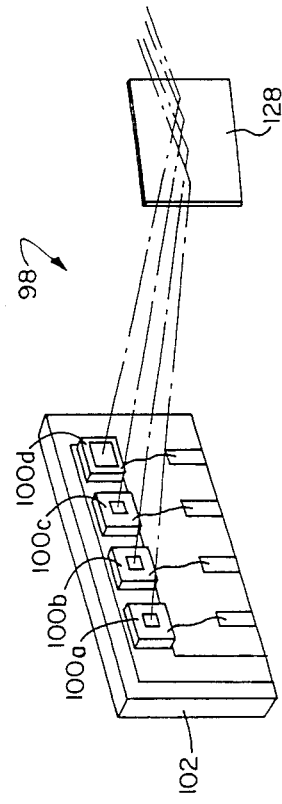
FIG. 8 is an enlarged perspective view showing an arrangement of light emitting elements.

As shown in FIGS. 5 and 8, the light emitting diodes 100a-d are mounted on a linearly adjustable planar board assembly 102. The board assembly 102 is positioned at a location which insures that each bundle or beam of light spots from respective ones of the light emitting diodes 100a-d is focused at the film plane.

The light emitting diodes 100a-d are arranged in spaced apart and generally horizontal relationship relative to the base of the housing assembly 32. The light emitting diodes 100a-d when energized respectively produce red, green, green and blue spectral wavelengths. It should be noted that the light emitting diodes 100a-d can have other spatial arrangements so long as the light produced by each light emitting diode reaches essentially the same pixels or spots on the image forming area. The light emitting diodes 100a-d provide spots or pixel sizes adequate for exposing the film to provide for desired image resolution. In this embodiment, the size of each pixel produced by the light emitting diodes 100a-c is 0.0062×0.003 inches. The size of the blue light diode 100d is larger than the others. Greater light emitting area is generally needed with blue light emitting diodes since the blue light intensity is generally less than that for red and green. The larger blue pixel while being relatively blurred, will not appear blurred to the human eye. The second green light emitting diode is used because there is insufficient energy provided by a single green diode for full green exposure and the relative costs of green diodes are low. However, blue diodes are expensive and, therefore, the previously noted techniques for enhancing blue are utilized.

The sequencing of light emitting diode energization is performed in a manner whereby, for example, the modulated beam of red light falls on a first spot of the film unit 14 followed, in time, by modulated beams of green, green and blue light. It will be appreciated that the same film area or pixel spot will, therefore, be imaged consecutively by the three noted colors. More particularly, when the first film spot is being imaged with the first green light, the next or second film spot, along the scanning line of exposure in the fast scan direction, is being imaged with red light. After the first spot has been consecutively imaged with red and green light, the second beam of green light is imaged on the first film spot, while the red light is imaged on a third film spot and the first green light is imaged on the second film spot. Subsequently, the blue light is imaged on the first film spot, the red light is imaged on a fourth film spot, the first green light is imaged on a third film spot, and the second green light on the second film spot. Thus, the same film spots will be imaged consecutively by the four light emitting diodes 100a-d. This sequencing of colors on successive spots is continued throughout the fast scan. The light emitting diodes 100a-d by being arranged in a horizontal manner provide a scanning action which is efficient.

Figure 11:
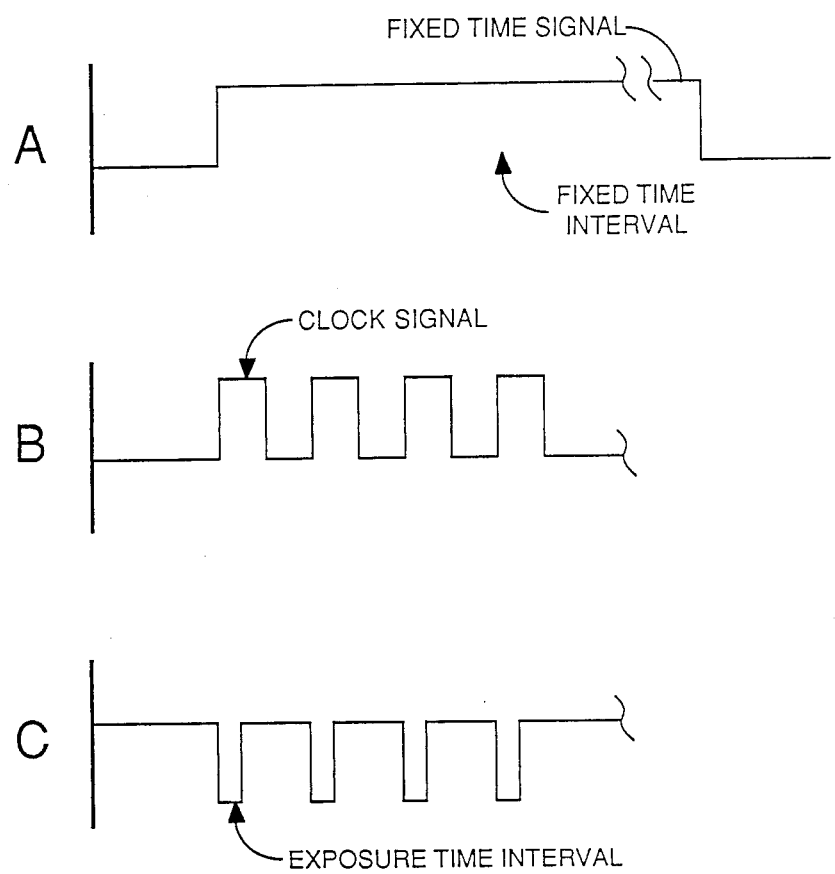

Reference is now made to FIG. 9 for illustrating the improved electronic control apparatus 12. The control apparatus 12 includes a phase locked loop (PLL) circuit 104 as well as the encoder mechanism 92. The output signals of the encoder mechanism 92 are at a frequency which is a function of the rotational speed of the encoder marks and, therefore, the driving motor 58. The PLL circuit 104 is a frequency multiplier device which produces higher output frequencies that provide periodic pixel-to-pixel control signals (FIG. 11B) which activate the timing circuit designated generally by reference numeral 108. The timing circuit 108 is responsible for controlling the energization of the light emitting diodes 100a-d and, therefore, the presentation of data to the film unit 14.

In this embodiment, PLL circuit 104 multiplies the number of encoder marks sensed by the encoder sensor 96 by a factor of four. Thus, for every encoder mark sensed, four pixel energization or periodic control signals are generated by the PLL circuit 104. With such a ratio, the encoder wheel 94 need not possess an encoder mark for every pixel which is to be generated and yet there still exists sufficient encoder data to achieve a quality image with the noted four to one interpolation.

For the size of prints to be produced by the printing apparatus 10, there should be generated about 1024 pixels per scan line. This number is selected given the size of each pixel and thus 1024 pixels correspond to the width of the photosensitive image forming area of each film unit 14. An encoder wheel having marks on it for 1:1 pixel points would not only be rather difficult to produce, but would be difficult to align properly with an associated encoder wheel sensor. It will be understood, that a reduction in the number of encoder marks is significant insofar as it simplifies the overall encoder mechanism. Thus, the PLL circuit 104 provides a desired ratio of pseudo control signals for every encoder mark sensed. The ratio of four control signals or energization signals for every encoder mark signal provides very good results in regard to maintaining the scanning line straight. Other ratios (e.g. 2 to 1; 8 to 1) can be utilized. These ratios lead to acceptable straight line runout.

The encoder wheel 94 also provides a start signal which commences operation of the timing functions of the electronic control apparatus for a complete printing cycle. This invention utilizes the start signal responsive to a start mark on the wheel 94 once in a printing cycle and does not repeatedly use it for every scan of a new line. This obviates any special requirements which would otherwise be required in order to have a start mark precisely located for each new scan line. Accordingly, the approach of this invention is different from known approaches which repeatedly utilize a mark signal for every scan line.

As noted, the frequency output of the PLL circuit 104 are a predetermined number pixel-to-pixel periodic control signals which activate the timing circuit 108. These control signals are, in effect, locked to the rotational speed of the encoder wheel 94 and thereby movement of the scanning mirror 82. Thus, the encoder mechanism 92 and the PLL circuit 104 provide for periodic control signals the frequency of which being representative of the scanning speed of the light beams.

The timing circuit 108 includes a plurality of interval counters 108a-e which are used for establishing predetermined fixed time interval signals (FIG. 11A) for corresponding light emitting diodes 100a-d per scanning line during which each of the light emitting diodes is energizable. In particular, the periodic control signals from the PLL circuit 104 are successively fed to all the interval counters 108a-e. The counters 108a-d limit the total amount of "on" time of the respective diodes 100a-d in the printing direction, per line. The counter 108e limits the total amount of "on" time of the diode 100d in the rescan direction, per line. The counters 108a-e are activated in response to the start signal of the encoder sensor 96 at the commencement of a printing operation. The interval counters 108a-e also count the number of periodic control signals, per line. Thus, the counters 108a-c will stay on for 1024 periodic control signals in the scanning direction. The blue interval counter 108e will stay on for 1024 periodic control signals in the rescan or reverse direction. The reverse interval time is in response to the blue reverse interval counter 108e which stays on for 1024 periodic control signals during rescan or retrace. The blue reverse interval counter 108e counts the periodic control signals during rescan of the blue light. At the end of rescan, after the counter 108e counts the periodic control signals during rescan per line, the interval counter 108e signals a microprocessor, to be described, that a scanning line has been traversed in both the forward and rescan directions. Accordingly, the microprocessor is ready to activate the buffer, which is always kept full with data for printing, so as to transmit information data signals regarding a new image line. Consequently, the encoder system need not be provided with accurately formed and aligned start marks.

The counters 108a-e detect or mark the start or leading edge of each control signal. By detecting the leading edge, the start of each pixel's exposure time interval is generated. Thus, the leading edge marks an allowed pixel exposure location. The period of each control signal determines the maximum time, respective light emitting diodes 100a-d can stay on per pixel location or spot on the film. This time is chosen so as to successfully image the film, in the minimum acceptable time, within the bounds of energy from the light emitting diodes 100a-d taking into account the sensitivity of the film. The maximum exposable time interval or period of each control signal is established by dividing one of the fixed time intervals by the number of pixels (e.g. 1024) in a line. The number of pixels in a line, as noted, is a function of the number of pixel spots of predetermined size that are to appear in the length of a scanning line across the image forming area of the film unit 14.

In this embodiment, the fixed time interval for the red light emitting diode 100a is 26 milliseconds. It being earlier noted that this value is the maximum time for the pixels being generated in the printing direction or during fast scan. This fixed time interval is adequate to allow the red diode 100a to be energized or fired 1024 times, with the period of each periodic control signal being for a maximum time interval of about 25 microseconds.

The commencement of the green and blue fixed time intervals, in response to the noted start signal, are staggered with respect to each other and the start of the red interval. This takes into account the physical staggering of the light emitting diodes 100a-d on the diode mounting board 102. Both the fixed time intervals for the green interval counters 108b,c are approximately equal to 26 milliseconds. With respect to the blue fixed time intervals, this embodiment teaches that during scan and rescan, the blue fixed time intervals are established by the interval counters 108d,e; respectively. The blue light emitting diode 100d is energizable during scan for 26 msec. while the interval counter 108e establishes the length of time the blue diode 100d is energizable during rescan, which is 26 msec. Therefore, blue light will show up twice during a single rotation of the cam 78. This is to compensate for the generally poor blue energy output of most blue light emitting diodes. The fixed time intervals for the green light emitting diodes also correspond to the width of the film unit and the fixed time intervals for the blue are, as noted, done twice for such a width. Of course, blue rescan would not be needed if an acceptable energy output of a blue light emitting diode could be used.

The red interval counter 108a has connected thereto a red LED clock device 110a that provides a red exposure time interval signal for every periodic control signal. The red exposure time interval signal governs the amount of actual time the red light emitting diode 100a is on for each periodic control signal. Thus, it controls exposure of a pixel spot. The red light emitting diode 100a produces sufficient energy for exposing the film spot in less than the noted maximum exposable time interval of 25 microseconds. In this embodiment, red light emitting diode 100a actually exposes for an exposure time interval which is about 10 microseconds. This is satisfactory for exposing the noted film unit 14. Since there are two green light emitting diodes 100b,c, the timing circuit 108 includes two green LED clocks 110b,c; one for each of the corresponding green light emitting diodes. Thus, the green LED clocks 110b,c control the actual exposure time interval of their corresponding green light emitting diodes 100b,c. In this embodiment, the exposure time interval for the green diodes is approximately 22 microseconds. There is provided a blue LED clock 110d for both the blue counters 108d,e. The blue LED clock 110d controls the actual exposure time interval of the blue light emitting diode 100d for each periodic control signal during both forward scan and rescan. In this embodiment, the blue clock 110d is effective to energize the blue light emitting diode 110d for about 17 microseconds for each periodic control signal. The exposure time interval signals going from each of the LED clocks 110a-d correspond in number and frequency to the control signals and are transmitted to corresponding memory devices, such as buffer storage devices 112a-d. The output of the respective LED clocks 110a-d clock the data from corresponding ones of the buffer storage devices 112a-d. The buffer devices can be of the FIFO type. The buffer storage devices 112a-d are also coupled to an output of a microprocessor unit (CPU) including an internal memory, both represented by reference numeral 114, which provides image information data signals for the respective light emitting diodes 100a-d for each pixel spot. It should be stated that the LED clocks 110a-d can have the preset time values of respective exposure time interval signals changed especially so that red and green do not degrade the MTF (Modulation Transfer Function). The LED clock exposure time interval signals of each of the LED clocks 110a-d are also transmitted to corresponding ones of the current drivers 116a-d so as to actually regulate the time current is provided by these drivers.

The electronic data presentation of successive image information data signals relating to successive pixels on successive lines to be scanned is forwarded from the output of the memory unit controlled by or included in the microprocessor unit 114 to respective ones of the buffer devices 112a-d for sequential use by the corresponding light emitting diodes 100a-d. Essentially, the image information data signal for each pixel transferred to respective ones of the buffer devices 112a-d will include whether or not the respective light emitting diodes 100a-d are to be energized and the intensity of current supplied to each of the diodes by the current drivers 116a-d for each such pixel. In this regard, each image information data signal provides eight bits of color level information relating to the current intensity levels for each pixel. Another input to the respective buffer devices 112a-d are the respective ones of noted exposure time interval signals of the corresponding LED clocks 110a-d which clock the buffer devices 112a-d. Each exposure time interval signal effects transfer of a successive signal image information data signal relating to a single pixel from respective ones of the buffer devices 112a-d to the current drivers 116a-d. If, for example, the value of red intensity for a particular pixel is zero, the buffer device 112a will not signal energization of the current driver 116a. If, for example, the value of the image information data signal coming through the buffer device 112a is at a maximum; then the current driver 116a will be energized to the maximum level. Therefore, the red light emitting diode 100a will be at its brightest.

The current drivers 116a-d are digital to current converters of the type known as current mirror amplifiers. These provide an analog output of current to respective ones of the light emitting diodes 100a-d. The buffer devices 112a-d and the current drivers 116a-d provide means for energizing respective ones of the light emitting diodes 100a-d in response to successive ones of the image information data signals and the exposure time interval signals.

It will, of course, be understood that the other light emitting diodes 100b-d are energized or not in the same manner as the red light emitting diode 100a.

Figure 4:
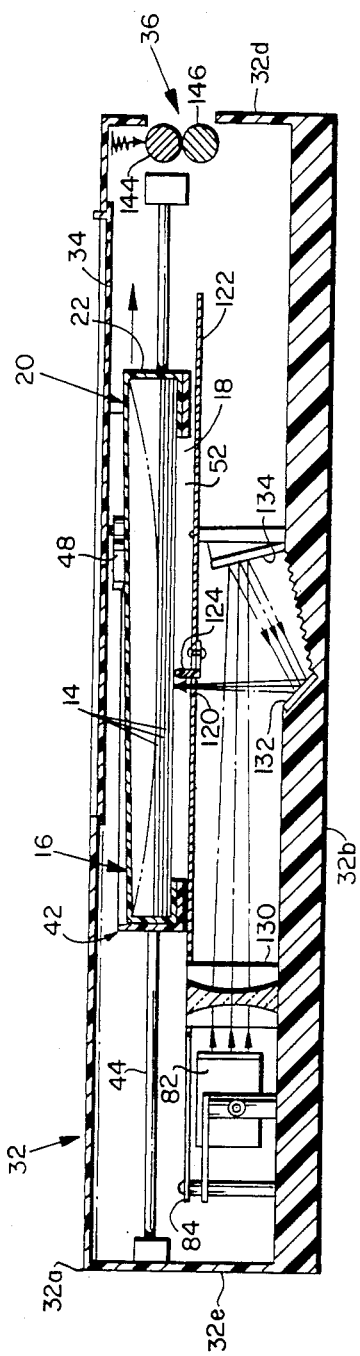
FIG. 4 is a longitudinal view taken in cross-section showing other components of the preferred embodiment.

Reference is now being made to FIGS. 2, 4 and 5 for illustrating an optical system 118 for use in the image printing apparatus 10. Essentially, the optical system 118 provides means for imaging the light bundles or beams from the light emitting diodes 100a-d onto the image forming area through an elongated scanning slot 120 (FIG. 4) formed in a horizontally supported masking plate 122. The masking plate 122 is supported in the housing assembly 32 immediately adjacent the image areas of the film units 14 to be exposed. The scanning slot 120 allows formation of the exposure or scanning line. The scanning slot 120 is arranged to extend across the width of the image areas being exposed. A resilient low-friction film flattener 124 is provided so as to interfere slightly with the film unit and is aligned adjacent the exposure line.

The optical system 118 of this embodiment is similar to the one described in the last-noted application. Hence, a detailed description is not believed necessary for an understanding of this invention. For understanding this invention though the optical system 118 is essentially a preobjective scanning optical system, whereby the light emitted from the light emitting diodes 100a-d can scan along a predetermined flat path. The preobjective scanning system to be described in this embodiment is but one of several which can be employed. A lens group 126 directs the beams from a stationary mirror 128 to the scanning mirror 82. From the scanning mirror 82 the beams are directed to a light converging lens group 130. From the light converging lens group 130 the beams of light strike a pair of suitably placed reflecting mirrors 132 and 134 and go through the scanning slot 120 onto the flat film plane. Of course, the mirrors 132 and 134 are of a length sufficient to allow scanning across the width of a film imaging area. The lens groups 126 and 130 are effective to insure that the bundle of light from each of the light emitting diodes is focused on the exposure line.

Figure 6:
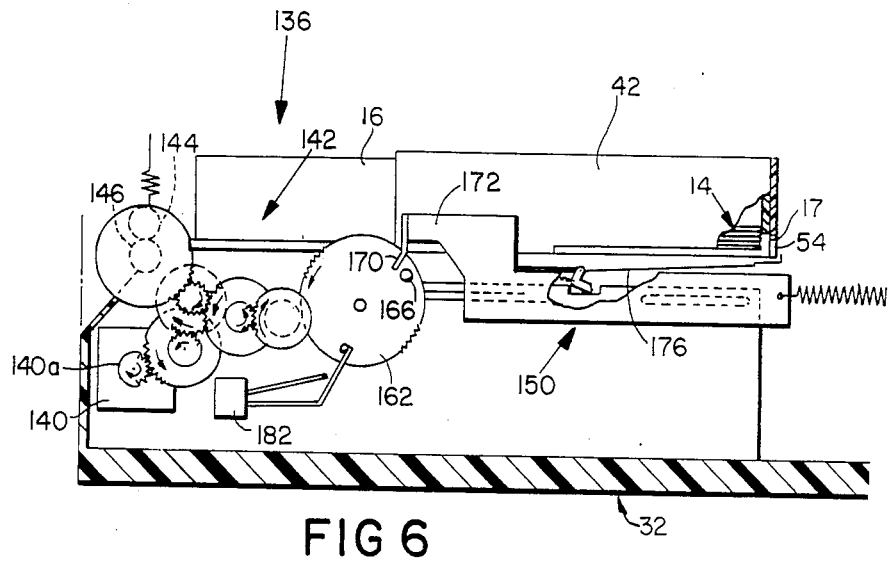
FIG. 6 is a fragmented side elevational view showing components forming part of the film processing mechanism of this embodiment.
Figure 7:
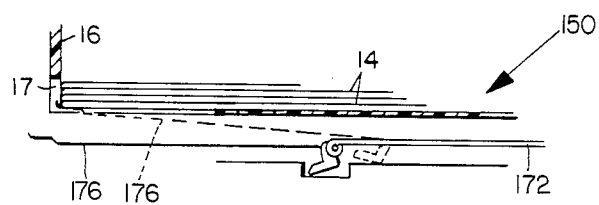
FIG. 7 is an enlarged and fragmented view showing a film picking arrangement of the present invention.

Reference is now being made to FIGS. 6 and 7 for showing a processing mechanism 136 for processing each of the exposed film units 14 subsequent to being imaged. The processing mechanism 136 is similar to that described in the last-noted application. Hence, a detailed description thereof is not believed necessary. Essentially, the processing mechanism 136 includes a motor 140, a gear train assembly 142 for driving a pair of film processing rollers 144 and 146 and a film picking mechanism 150.

The gear train assembly 142 transfers rotation from a geared motor output shaft 140a to the film picking mechanism 150. The gear train assembly drives the processing rollers 144, 146, in a well-known manner, when the motor 140 is energized. The processing rollers 144 and 146 provide progressive pressure on the film units 14 as the latter travel therepast. The film picking mechanism 150 is supported for generally reciprocal movement adjacent the film cassette 16. The film picking mechanism 150 is actuated upon rotation of the motor output shaft 140a. As a result, a sequencing gear 162 rotates and a lug 166 thereto is arranged to engage a tab 170 at the forward end of a pick slide 172. This engagement causes sliding movement of the pick slide 172 towards the forward position of the housing assembly 32 for a limited stroke which is effective to cause a pick arm 176 which is connected to the slide 172, to engage the film unit 14. Continued rotation of the sequencing gear 162 will, of course, result in the pick arm 176 advancing the film unit 14 through the opening slot 28, whereby the leading edge of the exited film unit is brought into engagement with the nip of the processing rollers 144, 146. Continued rotation of the sequencing gear 162 causes the lug 166 to rotate and drive past the tab 170 so it will then engage a switch 182. The switch 182 is effective, through operation of the microprocessor 114, to stop operation of the motor 140. Engagement of the switch 182 is timed to occur after the film unit 14 has been advanced from both the film cassette 16 and the housing assembly 32 by the processing rollers 144, 146. Accordingly, the exited film unit 14 can be removed by an operator. Operation of the image printing apparatus 10 is set forth below.

It is believed operation of the printer is understood from the foregoing description. The cassette 16 is placed face down in the film cassette carriage 42. For securing the cassette 16, the clamping arms 48 are pivoted to overlap and engage the bottom wall 20. Thus, the cassette 16 is in a stable orientation during an operating cycle.

To commence printing, the switch 38 is actuated. In response thereto, an operating program of the microcomputer unit 114 is effective to energize the motor 140. The film picking mechanism 150 is operative to eject the dark slide from the film cassette 16 and the housing assembly 32 by the processing rollers 144, 146. Thereafter, the control circuit 12 actuates the driving motor 58 so that the lead screw 62 rotates in a direction which is effective for moving the film cassette carriage 42 in the retraction direction towards the start printing position. When the switch contact 68 engages the limit switch 70, this is effective to cause the control circuit 12 to stop the driving motor 58. Following the foregoing sequence, the apparatus 10 is ready, after a suitable time delay, to generate and expose or print images on the image forming areas of successive film units. Raster scanning of the image to be printed is achieved as follows. The microprocessor 114 is effective to again operate the driving motor 58. As noted, operation of the driving motor 58 drives synchronously the fast and slow scanning movements. Hence, a single driving means is responsive for displaceably driving both fast and slow scanning movements.

For effecting the fast scanning movement, the shaft 80 rotates the cam 78 which is responsible for driving the scanning mirror 82. As pointed out, the scanning mirror 82 moves in equal increments across the scan line, thereby insuring that each pixel spot on the film unit 14 will be imaged by respective ones of the light emitting diodes 100a-d. Equal increments minimize scan distortion. One rotation of the cam 78 is effective to image the scan line and cause a retrace of the mirror 82 to its normal condition at the beginning of the line scanning cycle.

Synchronously with the fast scanning, the slow scanning is performed. In this regard, operation of the drive motor 58 causes simultaneous rotation of the lead screw 62 thereby synchronously advancing the film cassette carriage 42. The combined effect of slow and fast scanning movements results in raster scanning of the image on the image forming areas. Significantly, because of the control circuit 12 the energization of the light emitting diodes 100a-d is synchronous to the slow and fast scanning. This is because the energization is synchronous with the rotation of the motor 58 since the encoder ticks of the sensor 96 are proportional to the speed of the encoder wheel 94. Accordingly, the system can be run in an open loop mode without expensive controls for its operation and the printing or exposure of exposure lines will be uniform despite fluctuation in motor speed caused by, for example, variations in power to the motor. Each encoder tick is responsible due to the circuit 104 to cause a predetermined number of pixel exposure time interval signals. These signals are effective to allow for energization of the diodes 100a-d. Image informaion data signals received by the microprocessor 114 from any well-known source, such as video sources, magnetic tape or disc is thereafter directed to the buffer devices 112a-d and the current drivers 116a-d to modulate the intensity of the output of the light emitting diodes 100a-d. Image information data need not be specifically provided by a microprocessor, but can be processed by, for example, any kind of application specific integrated circuit.

It will be appreciated that the optical imaging system 118 directs the light of the light emitting diodes 100a-d onto the planar focal plane formed by the flexible film flattener 124 at the image forming surface. As noted, the optical system insures that the images of the spots along the scanning line are within acceptable tolerances for size.

When the switch contact 68 engages the limit switch 72, the control circuit 12 is effective to commence operation of the film processing mechanism 136 for ejecting and processing the just exposed film unit 14 from both the cassette 16 and the housing assembly 32 in the manner noted above.

Figure 10:
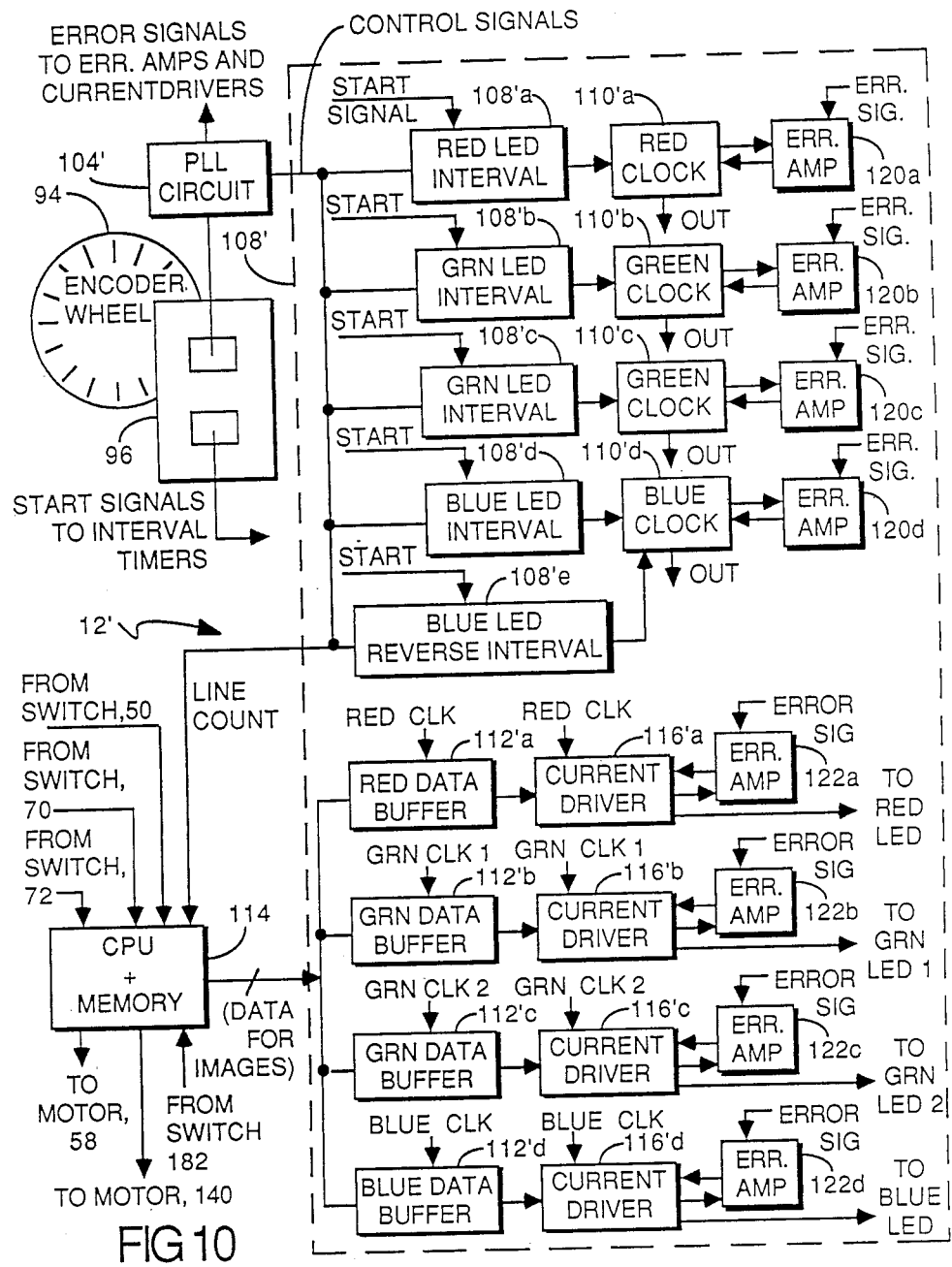
FIG. 10 is a block diagram of control circuitry for use in another embodiment of the apparatus of this invention; and, FIGS. 11 A-C are diagrammatic views of several signals which are utilized in the present invention.

Reference is now made to FIG. 10 for illustrating another embodiment of the control apparatus of this invention. The structure of this embodiment which is the same as the previous embodiment will be represented by the same reference numerals with, however, the addition of a prime marking.

According to this embodiment, provision can be made for regulating the output of the light emitting diodes 100a-d for compensating for variations in the speed of the motor 58. Accordingly, the frequency of the feedback signals from the sensor 96 will vary. Compensation can be done by varying the current level of the current drivers 116'a-d and the time the light emitting diodes 100a-d are "on". This is accomplished by using an error signal from the PLL circuit 140', which track the speed of the driving motor 58 and thereby the scanning mirror 82, by monitoring the encoder wheel pulses. The changes in error signals are used to modulate the duration of the exposure time interval signals of the LED clocks 110'a-d and the intensity of current from the current drivers 116'a-d. A plurality of circuits 120a-d are connected respectively to outputs of the LED clocks 110'a-d. The circuits 120a-d are basically error signal type proportional amplifiers having suitable gain which provide outputs proportional to the changes based on the error signals in the preselected frequency of the clock pulse signals fed to the LED clocks 110'a-d. Thus, the clock exposure intervals can be increased or decreased accordingly. The outputs of the clocks 110'a-d are also respectively connected to the buffer devices 112'a-d and the current drivers 116'a-d for the reasons noted above in connection with the other embodiment. Other suitable circuitry for the circuits 120a-d can be provided. A plurality of circuits 122a-d are respectively and operatively connected to the input of the current drivers 116'a-d. These circuits 122a-d respectively adjust the output of each current driver 116'a-d in response to error signals from the PLL circuit 104'. The circuits 122a-d are error signal type proportional amplifiers as noted in connection with the circuits 120a-d but can be other suitable circuits as well. Thus, as the motor 58 slows, the exposure time intervals of the LED clocks 110'a-d is suitably increased and the current from the current drivers is suitably decreased. In this fashion, the total effect of the light emitting diodes 100a-d on a pixel of a film unit 14 is relatively constant. If the motor 58 should speed up, the current from the current drivers 116'a-d is suitably increased and the energizing time interval of the LED clocks 110'a-d is suitably decreased. It will be appreciated that the changes made are done so that the exposure of each pixel is the same regardless of whether the scanning speed increases or decreases. Accordingly, current from the current drivers 116'a-d and the time interval established by the LED clocks 110'a-d are varied to provide such constant exposure.

The circuits 120a-d and 122a-d provide means responsive to the periodic control signals and are operatively coupled to respective ones of the LED clocks 110'a-d and the current drivers 116'a-d. This is done so as to adjust respectively the time of the exposure time signals of the clock and the current intensity of the current drivers, whereby whether the frequency of the periodic control signals increase or decrease, the light output of each of the light emitting diodes 100a-d per pixel is generally constant relative to corresponding ones of the information data signals.

The present invention may be embodied in other specific forms without departing from the spirit or essential characteristics thereof. The present embodiments are, therefore, to be considered in all respects as illustrative and not restrictive. The scope of the invention being indicated by the appended claims rather than by the foregoing description and all changes which come within the meaning and the range of equivalency of the claims are therefore intended to be embraced therein.

What is claimed:

1. An electronic image printing apparatus for printing images on image recording material, said apparatus comprising:

a housing assembly;

means disposed in said housing assembly for advancing the image recording material relative to said housing assembly in at least a first printing direction;

at least one light beam producing means operable for producing a light beam in response to respective energization thereof;

light beam scanning means operable for scanning the light beams in a second printing direction transverse to said first printing direction across a scanning line on the image recording material;

means for displaceably driving said light beam scanning means;

means for providing a periodic control signal responsive to said displacement by said driving means, the frequency of said periodic control signal being representative of the scanning speed of the light beam in said second printing direction; and for providing at least a start signal representative of commencement of a printing cycle;

means responsive to said control and start signals for providing at least a fixed time interval for said light beam producing means for each scanning line;

means responsive to said control signals for providing a predetermined number of pixel-to-pixel exposure time interval signals for each scanning line, each of said exposure time interval signals having a time duration equivalent in time to a maximum exposable time interval during which said light beam producing means is energizable, said exposure time interval signals having a preselected frequency ratio relative to the frequency of said control signals;

means for providing image information data signals for successive pixels on successive lines on the image recording material, said information data signals representing the amount of current to be supplied to said light beam producing means for successive pixels on successive lines on the image recording material;

means responsive to successive ones of said image information data signals and to corresponding successive ones of said pixel exposure time interval signals for energizing said light beam producing means; and, optical means for directing the light beam onto the image recording material.

2. The apparatus of claim 1 wherein:
said driving means includes a rotary motor having a rotary output; and,
said means for providing periodic control signals and said start signal includes encoding means responsive to said rotary output.

3. The apparatus of claim 2 wherein:
said means for providing said periodic control signals includes a phase locked loop circuit.

4. The apparatus of claim 3 wherein:
said means for providing said fixed time intervals includes at least an interval counter which establishes said fixed time intervals for said light beam producing means, said counter also counting a predetermined number of control said signals for each scanning line, thereby indicating each new scanning line.

5. The apparatus of claim 4 wherein:
said means for providing image information data signals includes a microprocessor unit having a memory device associated therewith, said data signals providing color level information relating to current intensity levels for each pixel.

6. The apparatus of claim 5 wherein:
said means responsive to successive ones of said image information data signals and corresponding ones of said exposure time interval signals includes at least a buffer means which is associated with said light beam producing means and is responsive to said information data signals and said clock exposure time interval signals; and means including at least a current driver means which is responsive to corresponding outputs of said buffer means and said exposure time interval signals for energizing said light beam producing means.

7. The apparatus of claim 6 wherein:
said phase locked loop circuit provides error signals; and, means responsive to said error signals and being operatively coupled to said means for producing said exposure time interval signals for adjusting the time of each said exposure time interval signal, said adjusting means being coupled to said current driver means for adjusting the current intensity of said current driver means, so as to compensate for fluctuations in the frequency of said exposure time interval signals, whereby whether the frequency of said exposure time interval signals increases or decreases, light output of said light producing means per pixel spot is generally constant.

8. The apparatus of claim 1 wherein:
said ratio of exposure time interval signals to said control signals is about 4:1.

9. An electronic image printing apparatus for printing images on image recording material, said apparatus comprising:

a housing assembly;

means disposed in said housing assembly for advancing the image recording material relative to said housing assembly in at least a first printing direction;

a plurality of light beam producing means each being operable for producing a corresponding number of spectrally different wavelength light beams in response to respective energization thereof;

light beam scanning means operable for scanning the light beams in a second printing direction transverse to said printing direction across a scanning line on the image recording material;

means for displaceably driving at least said light beam scanning means;

means for providing periodic control signals responsive to said displacement by said driving means, the frequency of said periodic control signal being representative of the scanning speed of the light beam in said second printing direction; and for providing at least a start signal representative of commencement of a printing cycle;

means responsive to said control and start signals for providing fixed time intervals for each of said light beam producing means for each scanning line, during each of said fixed intervals corresponding ones of said light beam producing means are energizable;

means responsive to said control signals for providing a predetermined number of pixel-to-pixel exposure time interval signals for each scanning line, each of said exposure time interval signals having a time duration equivalent in time to a maximum exposable time interval during which said light beam producing means is energizable, said exposure time interval signals having a preselected frequency ratio relative to the frequency of said control signals;

means for providing image information data signals for each of respective ones of said light beam producing means for successive pixels on successive lines on the image recording material, said information data signals representing the amount of current to be supplied to respective ones of said light beam producing means for successive pixels on successive lines on the image recording material;

means responsive to successive ones of said image information data signals and to corresponding successive ones of said pixel exposure time interval signals for energizing respective ones of said light beam producing means; and, optical means for directing the light beam onto the image recording material.

10. The apparatus of claim 9 wherein:
said driving means includes a rotary motor having a rotary output; and,
said means for providing periodic control signals and said start signal includes encoding means responsive to said rotary output.

11. The apparatus of claim 10 wherein:
said means for providing said periodic control signals includes a phase locked loop circuit.

12. The apparatus of claim 11 wherein:
said means for providing said fixed time intervals includes a plurality of interval counters each of which establishes a corresponding one of said fixed time intervals for respective ones of said light beam producing means, said counters also counting a predetermined number of clock pulse signals for each scanning line, thereby indicating each new scanning line.

13. The apparatus of claim 12 wherein:
said means for providing image information data signals includes a microprocessor unit having a memory device associated therewith, said data signals providing color level information relating to current intensity levels for each pixel.

14. The apparatus of claim 13 wherein:
said means responsive to successive ones of said image information data signals and corresponding ones of said exposure time interval signals includes a plurality of buffer means each one of which is associated with a respective one of said light beam producing means and is responsive to said information data signals and said exposure time interval signals; and means including a plurality of current driver means each one of which is responsive to corresponding outputs of said buffer means and said exposure time interval signals for energizing respective ones of said light beam producing means.

15. The apparatus of claim 14 wherein:
said phase locked loop circuit provides error signals; and, means responsive to said error signals and being operatively coupled to respective ones of said means for producing said exposure time interval signals for adjusting the time of each said exposure time interval signals and to respective ones of said current driver means for adjusting the current intensity of each one of said current driver means, so as to compensate for fluctuations in the frequency of said exposure time interval signals, whereby whether the frequency of said exposure time interval signals increases or decreases, light output of said light producing means per pixel spot is generally constant.

16. The apparatus of claim 15 wherein:
said ratio of exposure time interval signals to said control signals is about 4:1.

* * * * *